US007859753B2

(12) United States Patent
Wang (10) Patent No.: US 7,859,753 B2
(45) Date of Patent: Dec. 28, 2010

(54) OPTICAL BIREFRINGENCE FILTERS WITH INTERLEAVED ABSORPTIVE AND ZERO DEGREE REFLECTIVE POLARIZERS

(75) Inventor: Xinghua Wang, Pittsburgh, PA (US)

(73) Assignee: Chem Image Corporation, Pittsburgh, PA (US)

( * ) Notice: Subject to any disclaimer, the term of this patent is extended or adjusted under 35 U.S.C. 154(b) by 549 days.

(21) Appl. No.: 11/611,924

(22) Filed: Dec. 18, 2006

(65) Prior Publication Data

US 2007/0139772 A1 Jun. 21, 2007

Related U.S. Application Data

(60) Provisional application No. 60/752,503, filed on Dec. 21, 2005.

(51) Int. Cl.
*G02B 5/30* (2006.01)
(52) U.S. Cl. .................. 359/498; 359/256; 359/259; 359/486; 359/491; 359/492; 359/885
(58) Field of Classification Search .................. None
See application file for complete search history.

(56) References Cited

U.S. PATENT DOCUMENTS

| 3,647,279 | A |   | 3/1972  | Sharpless et al. |
|-----------|---|---|---------|------------------|
| 4,197,008 | A |   | 4/1980  | Pinnow et al.    |
| 4,394,069 | A |   | 7/1983  | Kaye             |
| 4,848,877 | A |   | 7/1989  | Miller           |
| 5,247,378 | A |   | 9/1993  | Miller           |
| 5,387,920 | A |   | 2/1995  | Bos et al.       |
| 5,483,387 | A |   | 1/1996  | Bauhahn et al.   |
| 5,528,393 | A | * | 6/1996  | Sharp et al. ............... 349/74 |
| 5,689,317 | A |   | 11/1997 | Miller           |
| 5,892,612 | A |   | 4/1999  | Miller et al.    |
| 5,943,129 | A |   | 8/1999  | Hoyt et al.      |
| 5,953,083 | A |   | 9/1999  | Sharp            |
| 5,953,087 | A |   | 9/1999  | Hoyt             |

(Continued)

FOREIGN PATENT DOCUMENTS

WO     WO 00/244800         6/2002

(Continued)

OTHER PUBLICATIONS

Ammann, "Synthesis of Optical Birefringent Networks". Progress in Optics IX pp. 123-177 (1971).

(Continued)

*Primary Examiner*—Stephone B Allen
*Assistant Examiner*—Derek S Chapel
(74) *Attorney, Agent, or Firm*—Duane Morris (57) ABSTRACT

A wavelength discriminating optical filter has birefringent retarders stacked between polarizing filters, in relative rotational orientations causing passband wavelengths to emerge in a polarization state aligned to a second such polarizing filter, for transmission, whereas wavelengths at orthogonal polarization states are blocked. The second polarizing filter can be a wiregrid type that reflects the blocked orthogonal component backwards along the light signal propagation path. Internal reflections are minimized while obtaining a high transmission ratio and high discrimination for the passband wavelengths, by pairing a zero-degree reflective polarizer as the second or selection polarizer, with a preceding non-zero-degree reflective polarizer. The non-zero-degree reflective polarizer can absorb the blocked orthogonal polarization components, for example using an oriented dichroic material, or a polarizing cube or the like can be provided to divert the blocked polarization component.

12 Claims, 7 Drawing Sheets

U.S. PATENT DOCUMENTS

| | | | |
|---|---|---|---|
| 6,028,656 | A | 2/2000 | Buhrer et al. |
| 6,191,890 | B1 | 2/2001 | Baets et al. |
| 6,172,722 | B1 | 1/2002 | Sharp |
| 6,373,568 | B1 | 4/2002 | Miller et al. |
| 6,373,614 | B1 | 4/2002 | Miller |
| 6,403,947 | B1 | 6/2002 | Hoyt et al. |
| 6,417,892 | B1 | 7/2002 | Sharp et al. |
| 6,421,131 | B1 | 7/2002 | Miller |
| 6,455,861 | B1 | 9/2002 | Hoyt |
| 6,501,548 | B1 | 12/2002 | Oldenbourg |
| 6,535,257 | B2 | 3/2003 | Miller |
| 6,552,836 | B2 | 4/2003 | Miller |
| 6,566,143 | B2 | 5/2003 | Hoyt |
| 6,665,072 | B2 | 12/2003 | Hoyt |
| 6,674,527 | B2 | 1/2004 | Hoyt |
| 6,693,710 | B1 | 2/2004 | Hoyt |
| 6,710,831 | B1 | 3/2004 | Winker et al. |
| 6,734,962 | B2 | 5/2004 | Treado et al. |
| 6,760,475 | B1 | 7/2004 | Miller |
| 6,764,182 | B2 | 7/2004 | Ito et al. |
| 6,781,736 | B2 | 8/2004 | Hoyt et al. |
| 6,882,384 | B1 * | 4/2005 | Sharp .................. 349/78 |
| 6,927,834 | B2 | 8/2005 | Deary et al. |
| 6,985,216 | B2 | 1/2006 | Treado et al. |
| 6,992,809 | B1 | 1/2006 | Wang et al. |
| 6,999,155 | B2 | 2/2006 | Tillin et al. |
| 2001/0033376 | A1 | 10/2001 | Hoyt |
| 2003/0098918 | A1 | 5/2003 | Miller |
| 2003/0117705 | A1 | 6/2003 | Hoyt |
| 2007/0024779 | A1 | 2/2007 | Sharp |

OTHER PUBLICATIONS

Beckers, et al., "Observing the sun with a fully tunable Lyot-Ohman filter". Applied Optics, vol. 14, No. 9 pp. 2061-2066 (1975).

Call, et al., "Application of a Liquid Crystal Tunable Filter to Near-Infrared Spectral Searches". SETICon02 (2002).

Chu, et al., "Birefringent filter synthesis by use of a digital filter design algorithm". Applied Optics, vol. 41, No. 17 pp. 3412-3418 (2002).

Deng, et al. , "Inhomogeneous distribution of brightness in the split-element filter". Applied Optics, vol. 36, No. 7 pp. 1576-1579 (1997).

Evans, "The Birefringent Filter". J. Opt. Soc. Amer., vol. 39, No. 3 pp. 229-242 (1949).

Harris, et al. "Optical Network Synthesis Using Birefringent Crystals". I. Synthesis of Lossless Networks of Equal-Length Crystals. J. Opt. Soc. Am. vol. 54, No. 10 pp. 1267-1279 (1964).

Katzenstein, et al., "Realization of a New Type of Birefringent Filter". Applied Optics, vol. 10, No. 5 pp. 1119-1124 (1971).

Leroy, "SOLC Elements in Lyot-Oehman Filters". J. Optics vol. 11, No. 5 pp. 293-304 (1980).

Preuss, et al., "Three-stage birefringent filter tuning smoothly over the visible region theoretical treatment and experimental design". Applied Optics, vol. 19, No. 5 pp. 702-710 (1980).

Saeed, et al., "Multispectrum, spatially addressable polarization interference filter". J. Opt. Soc. Am. A, vol. 19, No. 11 pp. 2301-2312 (2002).

Scheffer, "New multicolor liquid crystal displays that use a twisted nematic electro-optical cell". J. Appl. Phys., vol. 44, No. 11 pp. 4799-4803 (1973).

Shabtay, et al., "Tunable birefringent filters—optimal iterative design". Optics Express, vol. 10, No. 26 pp. 1534-1541 (2002).

SOLC. "Birefringent Chain Filters". Opt. Soc. Am. vol. 55, No. 6 pp. 621-625 (1965).

Staromlynska, et al., "High-performance tunable filter". Applied Optics, vol. 37, No. 6 pp. 1081-1088 (1998).

Title, et al. "Tunable birefringent filters". Opt. Eng. 20(6), pp. 815-823 (1981).

Wang, et al., "Optimal design of birefringent filter with a flat-top passband". J. Opt. A: Pure Appl. Opt. 8 pp. 652-656 (2006).

Wu, et al., "Liquid-crystal-based switchable polarizers for sensor protection". Applied Optics, vol. 34, No. 31 pp. 7221-7227 (1995).

Yariv, et al. "Optical Waves in Crystals". Chapter 5 (1984).

Ye, "Liquid-crystal bandpass filter based on the optical rotary dispersion effect". Applied Optics, vol. 34, No. 20 p. 4007-4010 (2004).

Ye, "Low-loss birefringent spectral filters comprising three identical retarders". Applied Optics, vol. 45, No. 31 pp. 8044-8051 (2006).

Ye, "Low-loss tunable filter based on optical rotary dispersion". Applied Optics, vol. 45, No. 6 p. 1162-1168 (2006).

Zhou, et al., "Nearly-off-axis transmissivity of Solc birefringent filters". J. Opt. Soc. Am. A, vol. 20, No. 4 pp. 733-740 (2003).

Wu, "Design of a liquid crystal based tunable electrooptic filter". Applied Optics, vol. 28, No. 1 pp. 48-52 (1989).

* cited by examiner

Prior Art

FIG. 11b s-polarized unpolarized p-polarized

Prior Art

FIG. 11c

Prior Art

FIG. 11d

Prior Art

OPTICAL BIREFRINGENCE FILTERS WITH INTERLEAVED ABSORPTIVE AND ZERO DEGREE REFLECTIVE POLARIZERS

CROSS REFERENCE TO RELATED APPLICATION

This application claims priority of U.S. Provisional Application 60/752,503, filed Dec. 21, 2005.

BACKGROUND

1. Field of the Disclosure

This disclosure concerns optical wavelength filters having cascaded stages, the stages comprising birefringent retarders between polarizers. More particularly, the present disclosure relates to optical filters wherein polarizers that respectively precede and follow one or more of the retarder stacks are configured to include both absorptive and zero-degree reflective type polarizers.

2. Brief Description of Related Art

In a tunable birefringent filter, stacked retarders in a filter stage (or in plural cascaded stages) comprise fixed crystal retarders joined with tunable liquid crystals. The retarders are tuned in unison to adjust the wavelength transmission characteristic of the filter stage. Each filter stage has a comb transmission characteristic. With tuning, the transmission characteristics are adjustable such that bandpass peaks of successive stages overlap to discriminate for a selectable narrow wavelength band with high finesse.

A birefringent filter with multiple stages is disclosed, for example, in U.S. Pat. No. 6,992,809—Wang, the teachings of which are hereby incorporated by reference in their entireties. In a birefringent filter as described therein, orthogonal light components are differentially retarded by each retarder in a stack of retarders in each of several cascaded stages separated by polarizers. The differential retardation changes the polarization state of light passing through each respective retarder in a stack, causing different wavelengths to assume different polarization states. The polarization change caused by each member in the sequence of retarders in a stage is coordinated with the other members, so that selected wavelengths align with the exit polarizer and are passed to the next stage in cascade. The retarders are typically plates oriented normal to the axis of light propagation. The birefringences (typically thicknesses) and rotational angles of the retarders are arranged to achieve this effect.

There are several known configurations with stacked retarder thicknesses and related rotational angles that are useful in this way. Known configurations include (without limitation) the Solc, Lyot and Evans configurations, as well as some hybrid types. These configurations vary as to the number of polarizers used, the equal or unequal thicknesses of the retarders and the respective rotational angles of the retarders and the polarizers. At least one polarizer is used as a selection polarizer at the exit or output in each case.

The Solc, Lyot and Evans filter configurations were developed originally for spectral analysis of light in astrophysics, and typically consisted of one stage having several fixed crystals as the stacked birefringent retarders. In U.S. Pat. No. 6,992,809—Wang, cited above, plural cascaded stages of stacked retarders and interleaved polarizers are arranged along a light propagation path. One or more of the stages is tunable. Each retarder in a tunable stage comprises a liquid crystal controllable birefringence. For example, electrically tunable liquid crystals can be affixed to fixed birefringence crystal retarders. The fast and slow birefringence axes of the fixed and tunable birefringences are aligned. Tuning the liquid crystal, for example to increase birefringence, thus increases the retardation of the composite fixed and tunable elements, similar to what might be accomplished by making a fixed crystal thicker.

Birefringence filters are also known as interference filters. The transmitted wavelengths define a comb transmission characteristic, namely successive peaks at periodically related wavelengths, each peak having a given band width (generally measured as full width of a passband at half maximum amplitude, abbreviated "FWHM"). The transmission characteristic is periodic because a given retardation (whether considered as time or propagation distance) corresponds to the same phase angle for a succession of wavelengths. The distance between adjacent peaks is termed the free spectral range ("FSR"). It is desirable in a highly discriminating filter to have both a very narrow pass band width and a very large free spectral range. The ratio of these two factors is defined as the finesse of the filter. (Finesse=FSR/FWHM.)

In some possible configurations of Solc, Lyot, Evans and similar filters, the retardations contributed by each element in a stack of retarders is equal, typically by making the retarders equal in thickness along the light propagation path. In other configurations, the retarders have thicknesses that are related but not equal (e.g., thicknesses of "d," "2d" and "d" in sequence). In a tunable embodiment as in U.S. Pat. No. 6,992, 809—Wang, all the retarders in a stage are tuned in a coordinated way to maintain the same relationship. That is, if the retarders in a stack are equal according to the particular filter configuration (such as in Solc filters, for example), then all the liquid crystal elements are tuned to alter retardations equally for each member of the stack.

The effect of tuning the stage tends to expand or contract the comb filter transmission characteristic along the wavelength scale. Expanding the characteristic along the wavelength scale advantageously increases the free spectral range between peaks, but disadvantageously widens the pass band width. Conversely, tuning to contract the comb filter characteristic on the wavelength scale narrows the pass band width but disadvantageously reduces free spectral range.

The retarders within a stage are tuned in a coordinated way as necessary to expand or contract the comb shaped transmission characteristic on the wavelength scale, in order to place a pass band peak (or a band stop null) at a wavelength to which the filter is to be tuned. This is one way in which tuning is coordinated according to a technique as disclosed in Wang '809.

It is also an aspect of the technique in Wang '809 that successive filter stages are cascaded. In a band pass application (as opposed to band stop), cascading the transmission characteristics of two filters causes the transmission characteristics to multiply. Thus, at wavelengths where band pass peaks in the two filter characteristics coincide, multiplying the transmission characteristics advantageously causes the FWHM bandwidth of the cascaded filter peak to become narrower. At wavelengths where band pass peaks of one characteristic coincide with a low transmission null in the other characteristic, the resulting product is a null, which provides free spectral range between the next adjacent higher and lower bandpass peaks. If the stages of the filter have a given finesse value, cascading the stages produces a finesse equal to the product of the finesse values of the cascaded stages.

With several cascaded stages, preferably wherein the stages are tuned in a coordinated way, the cascaded filter has a high finesse and the ability to tune to bandpass wavelengths over a wide tuning range. However, each cascaded stage requires at least one polarizer at the exit of the propagation path through the sequence of rotationally oriented retarders of that stage. The exit polarizer is the selection element that passes light energy at wavelengths that the stacked retarders have presented in a polarization state aligned to the polarizer, and blocks light energy orthogonal to the polarizer. Each stage could also have an entrance polarizer to establish a starting polarization state, but typically, the exit or selection polarizer of a given stage functions as the entrance polarizer that establishes the polarization alignment of light propagating through to the next stage.

Each additional polarizer reduces the transmission ratio of light in the pass band to an extent. Polarizers block a high percentage of light energy aligned orthogonal to the polarizer, but also block a percentage of the light energy in the polarization state that is aligned parallel to the polarizer. It would be advantageous to employ a polarizer that has a high transmission ratio for light parallel to the polarizer and a high rejection ratio for light orthogonal to the polarizer. These aspects may be termed a high transmission ratio and a high degree of contrast.

Apart from ratio of transmission or rejection, there are additional considerations affecting the desirability of one kind or another. These considerations include the extent to which the polarizer acts on light that is normal to the plane of the polarizer versus off axis. Some types of polarizers maintain the direction of propagation and others divert orthogonal components. Some polarizers absorb relatively more of the rejected light energy and others reflect the rejected light energy, either opposite to the incident direction or otherwise.

An absorptive type polarizer can be produced as a stretched sheet of plastic film with a dichroic dye as a dopant. Dichroism is the property of some crystals and molecules to absorb light of one of two orthogonal polarization alignments more than light of the other alignment. Stretching the sheet or film orients the dichroic dopant molecules. The working principle is that for incident light containing components parallel to orthogonal polarization axes, one polarization is more strongly absorbed by the dye in the polymer film. The other polarization is more strongly transmitted. There is some loss in the transmitted component and some transmission of the orthogonal component. Although an absorptive sheet polarizer may fall at any point in a range of specifications, a typical transmission ratio is 60 to 93% (defined as the ratio of transmitted light energy when all the light energy is aligned to the transmission axis of the polarizer).

Another way to provide a polarizer is to provide a grid plate structure comprising parallel elements that are parallel and spaced so as to affect the extent to which light energy with orthogonal polarization components can propagate through. A so-called "wire grid" polarizer may have parallel wire-like lines at a given spacing or pitch (sometimes inaccurately termed the "period"). There are alternative ways to form the parallel linear elements that resemble wires. Therefore, another way to classify polarizers is wire-grid polarizers and non-wire-grid polarizers.

A polarizer may use effects other than dichroism and fenestrated linear grid structures. Certain crystalline structures and structures having interfaces of elements with distinct optical indices can be used as polarizers. Examples are the Brewster angle polarizer and the Glan-laser polarizer, which are both examples of non-wiregrid polarizers.

Accordingly, different sorts of polarizers can be classified according to various categories and subcategories. There are absorptive polarizers and reflective ones. Reflective polarizers can be zero-degree reflective polarizers (transmissive and reflective of orthogonal components that are strictly normal to the plane of polarizer plate) or non-zero degree reflective, for example diverting one orthogonal component relative to the other or perhaps reflective diffusely. In addition to these categories, polarizers might comprise thin sheets, surfaced plates, crystals with a substantial thickness or polarizing cubes.

These categorizations are partly structural and partly functional. For purposes of this disclosure, two important considerations are the extent to which the rejected orthogonal component of the light energy is absorbed (e.g., by dichroism) or diverted, and if diverted, whether the rejected component is directed precisely backwards along the propagation path.

SUMMARY

An object of the present disclosure is to optimally resolve design tradeoff decisions associated with the configuration of birefringence filters comprising cascaded stages of stacked retarders with interspersed polarizers.

The retarders cause differential retardation of orthogonal components of transmitted light that are aligned parallel to respective fast and slow axes of the birefringent retarders. The differential retardation varies the polarization state of the light as a function of wavelength. The retarder thicknesses, birefringence and relative rotational orientations are such that selected wavelengths emerge from respective filter stages in polarization alignment with an output polarizer. In this way, wavelengths are selectively passed or blocked at the output polarizer.

According to one aspect, polarizers that respectively precede and follow one or more of the retarder stacks are configured to include both absorptive and reflective type polarizers. By use of absorptive polarizers, internal reflections are eliminated, which is advantageous for imaging applications, but inherently limits the light energy transmission ratio for the pass band. An improved transmission ratio is obtained for the pass band, compared to a filter using only absorptive polarizers, by including one or more absorptive polarizers together with one or more reflective polarizers.

In one embodiment, zero-degree reflective polarizers, in particular wire-grid polarizer plates, are alternately used as one of the entry or exit polarizers in a cascaded succession of retarder stages wherein absorptive polarizer plates are used as the other of the entry or exit polarizers. The result is a good transmission ratio, good imaging performance, and good contrast between in-band transmission and out-of-band rejection.

In the different filter configurations, at least a selection polarizer is used for each stage, and in order to provide for a high degree of filter finesse, two or more stages can be cascaded. The filter is optimized for even a single stage, and preferably a cascade of stages, by using at least two polarizers. At least one polarizer follows a preceding polarizer along the signal propagation path and is a zero-degree reflective type. The second or following polarizer can be the selection polarizer at the output of a stage having only an entry polarizer and an output selection polarizer, or a different configuration can be used characterized by more than two polarizers in a stage. At least one preceding polarizer associated with the selection polarizer is a non-zero degree reflective type.

In whatever specific configuration (e.g., Solc, Lyot, Evans, etc.), the wavelength discriminating optical filter according to this disclosure has birefringent retarders stacked between polarizing filters, in relative rotational orientations causing passband wavelengths to emerge in a polarization state aligned to a second such polarizing filter, for transmission, whereas wavelengths at orthogonal polarization states are blocked. The second polarizing filter can be a wiregrid type used as the output selection polarizer, or another zero-degree reflective type. That is, the second polarizing filter reflects the blocked orthogonal component directly backwards along the light signal propagation path. However, internal reflections are minimized while obtaining a high transmission ratio and high discrimination for the passband wavelengths, by pairing a zero-degree reflective polarizer as the second or selection polarizer, with a preceding non-zero-degree reflective polarizer. The non-zero-degree reflective polarizer can absorb the blocked orthogonal polarization components, for example using an oriented dichroic material, or a polarizing cube or the like can be provided to divert the blocked polarization component.

In one embodiment, the filter has a number of cascaded stages. In at least one of the stages, at least two polarizers are provide as at least one preceding absorptive polarizer and at least one following reflective polarizer in combination. In another embodiment, all of the stages in the cascade can have a zero-degree reflective and a non-zero degree reflective polarizer.

In a filter configuration wherein the output selection of a preceding stage also functions as the input or entry polarizer to an abutting subsequent stage, every second stage actually is characterized by an absorptive polarizer as its selection polarizer and a zero-degree reflective polarizer as its input or entry polarizer. Nevertheless, by providing the alternately interspersed stages with the opposite order, namely an absorptive entry polarizer and a zero-degree reflective output selection polarizer, the elimination (or at least reduction) of internal reflections is achieved.

In at least every second cascaded stage, light energy propagating parallel to the propagation axis is filtered by a polarizer plate or other structure such as a wiregrid zero-degree reflective polarizer normal to the propagation axis. The polarizer reflects one of two orthogonal vector components of the light (namely the component that is rejected by the polarizer) in an opposite propagation direction parallel to the axis. The other component is transmitted through the polarizer, e.g., into a subsequent filter stage.

In at least one instance, and preferably at least every second stage, a zero-degree reflective polarizer is disposed further along the light propagation path through the filter than an absorptive polarizer that is disposed upstream along the path. In other respects, the arrangements of the polarizers (specifically the rotational orientations of the polarizers) and also the arrangements of the retarders (specifically birefringence, thickness and rotational orientation) can be according to any stacked retarder birefringence filter configuration. The placement of the reflective polarizer farther along the path from the absorptive polarizer is such that the light energy that is rejected by the downstream reflective polarizer and propagates backwards relative to the forward propagation path, is incident on the absorptive polarizer and is substantially absorbed and extinguished without producing internal reflections.

BRIEF DESCRIPTION

There are shown in the drawings certain embodiments as presently preferred. It should be understood that the scope of this disclosure is not limited to the embodiments disclosed as examples in the drawings, wherein.

DETAILED DESCRIPTION

Figure 1:
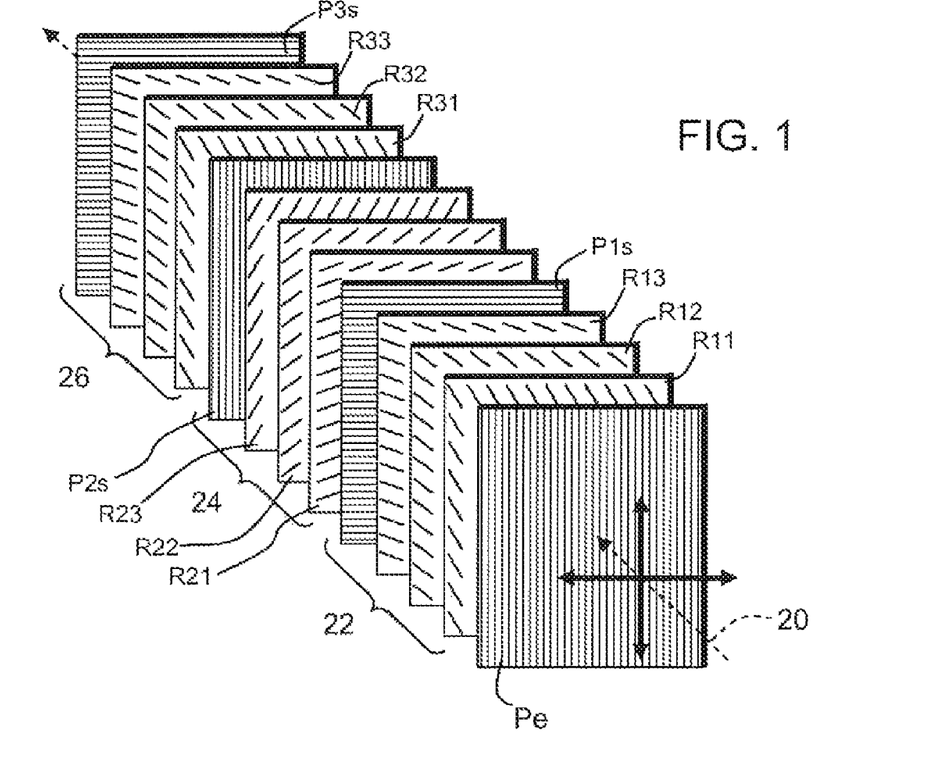
FIG. 1 is a schematic perspective view generally depicting the element of a liquid crystal filter comprising cascaded stages.

FIG. 1 shows the elements of a multiconjugate multi-stage liquid crystal tunable filter for discriminating between wavelength passbands versus other wavelengths. The filter comprises an input or entry polarizer $P_e$ that has a given rotational orientation relative to a light signal that is propagating normal to the plane of the polarizer $P_e$, namely parallel to the dotted line arrow as shown. The light signal is an electromagnetic wave having orthogonal components. Depending on the nature of the light signal, the orthogonal components may be more or less parallel or perpendicular to the orientation of the input or entry polarizer $P_e$. The vector component that is parallel to the polarizer orientation is transmitted through the polarizer $P_e$, and the vector component that is perpendicular to the polarizer is not transmitted.

Following the entry or input polarizer $P_e$, plural cascaded filter stages are arranged along the light propagation path or zero-degree axis, the stages each comprising a set of retarders $R_{n,m}$, where n is the stage number in progression and m is the retarder number in the stage. Each stage leads into a selection polarizer $P_{n,s}$. The selection polarizer at the end of a given stage, such as $P_{1s}$ at the end of stage one, for example, functions as the entry polarizer of the next successive stage (stage two).

Relative retardation of orthogonal components of a light signal changes the polarization state of the light signal. Assuming a plane polarized light signal encounters a retarder at 45 degrees to the plane of polarization, the signal is divided into two vector components parallel to the fast and slow axes of the birefringent retarder. The retardation is a function of birefringence and thickness of the retarder. The filter is arranged such that as light energy proceeds through the sequence of retarders and stages, only certain periodically related wavelengths emerge from each stage in a polarization state and alignment that permits the bandpass wavelength to pass through the corresponding selection polarizer $P_{ns}$. Other wavelengths are not transmitted.

For this purpose, the retarders such as $R_{11}$ though $R_{13}$ are rotationally oriented relative to one another and also relative to the orientation of the associated polarizers that precede and follow the retarders $R_{11}$ though $R_{13}$, in a particular progression that achieves a wavelength discrimination effect. The retarders are chosen to provide a differential delays that for particular wavelengths correspond to a given phase delay. The transmission characteristic is a comb filter transmission characteristic of successive peaks of a particular bandwidth (typically termed the full width at half maximum bandwidth or "FWHM"), separated by stop bands over a so-called free spectral range. A measure of quality of such as filter is the "finesse," defined as the ratio of free spectral range to FWHM.

According to one aspect, the polarizers that are provided along the light propagation path parallel to the zero-degree axis, are sequenced such that both zero-degree reflective and non-zero-degree reflective polarizers are included. This aspect results in an improved filter characteristic for reasons that will become apparent in view of this description.

The respective retarders, such as retarders $R_{11}$ though $R_{13}$ in stage one, are birefringent elements. Birefringent elements have orthogonal fast and slow axes due to their material characteristics. Light components that are parallel to the respective fast and slow axes propagate according to different optical indices. Thus if orthogonal light components parallel to the respective fast and slow axes are in phase when impinging on a retarder, those components are relatively retarded by propagation through the birefringent element.

Figure 2:
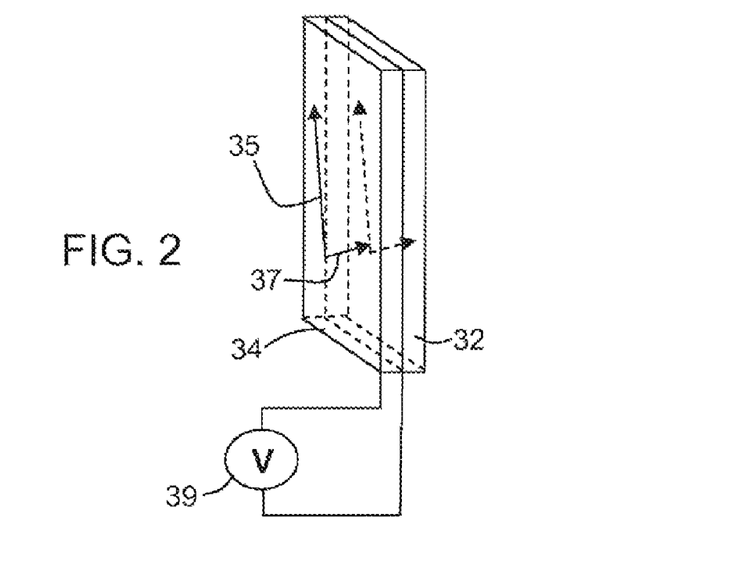
FIG. 2 is a perspective view illustrating the electrically controllable nature of the stacked retarders between polarizers in the stages shown in FIG. 1.

As shown in FIG. 2, each of the retarders in at least one of the stages, and optionally the retarders in all of the stages, are tunable. Each retarder comprises a fixed crystal retarder 32, such as a calcite crystal, rotationally aligned with and abutted with a tunable liquid crystal 34. The rotational alignment is that the fast axis 35 and slow axis 37 of the liquid crystal are respectively aligned parallel to the fast and slow axes of the fixed crystal retarder 32. A control voltage source 39 is coupled to the liquid crystal for adjusting the extent of birefringence contributed by the liquid crystal.

In a cascaded stage filter, the thicknesses and birefringence values of the retarders and their alignments relative to two or more polarizers are chosen to ensure that certain wavelength bands emerge from the retarders with a polarization alignment causing those bands to be transmitted through the polarizer. Other bands are rejected. The comb filter bandpass characteristic is adjusted by increasing and decreasing the birefringence contributed by the liquid crystals, which are controlled in a coordinated way. Typically, increasing and decreasing the birefringence of the filter causes the transmission characteristic to be compressed or expanded on the wavelength scale. As taught in the '809 patent, the correspondence or lack of correspondence of transmission peaks in the transmission characteristics can narrow the bandwidth of a selected pass band and also increase the free spectral range between successive pass bands in the comb characteristic.

Figure 3:
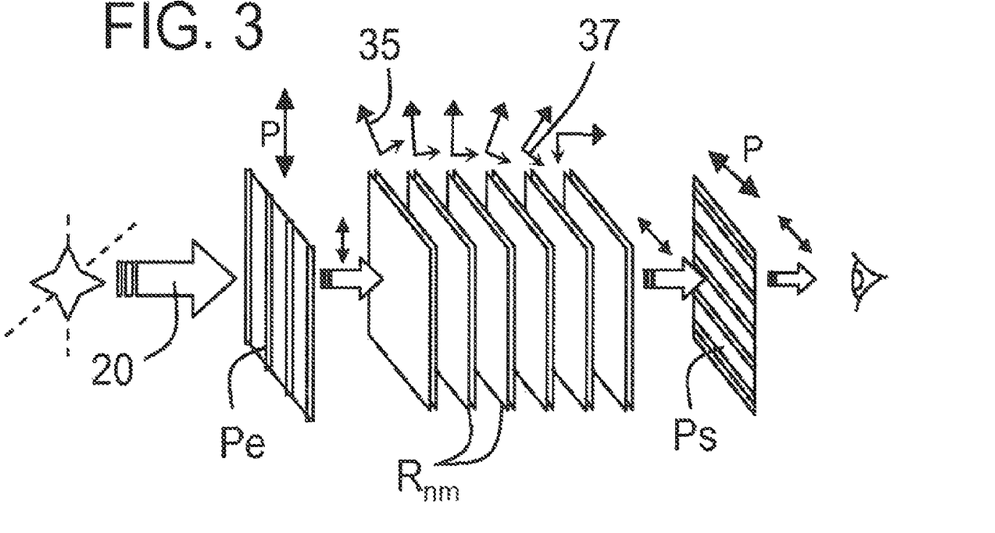
FIG. 3 is a schematic perspective view showing transmission of a pass bandwidth from a source to a receiver through a filter stage that can be one of plural stages in cascade.

In a possible birefringent filter arrangement, shown in FIG. 3, the light signal from a broadband source is passed through an entry polarizer $P_e$, with one of the orthogonal light components being transmitted as a plane polarized broadband signal. The fast axes 37 and slow axes 37 of each successive retarder R in the stack contributes differential retardation and as the differentially retarded components advance from retarder to retarder, the polarization state of the light is changed. The retardation as equated with time or propagation distance is a function of the birefringence and thickness of the retarders. The retardation time or distance is the same for all wavelengths. However the relationship of a given retardation to differential phase retardation is a function of wavelength. Therefore, the polarization state of the broadband light is caused to vary by wavelength. Only certain wavelengths emerge with a polarization alignment that corresponds to the alignment of the output or selection polarizer $P_s$. Those wavelengths are transmitted, for example to an imaging sensor, shown schematically in FIG. 3 as an eye.

Figure 4:
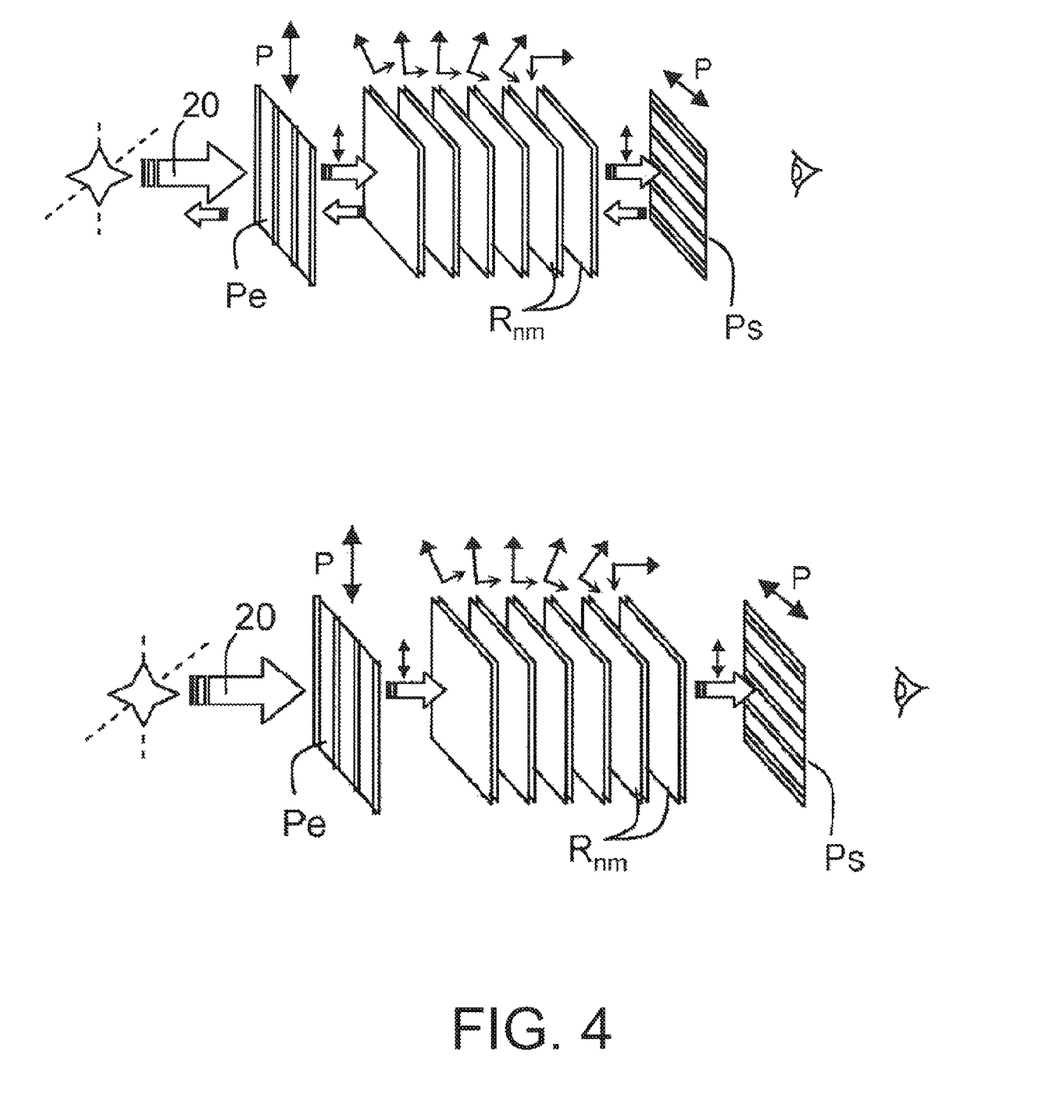
FIG. 4 is a schematic perspective view corresponding to FIG. 3 but showing reflection of a rejected bandwidth, specifically with a zero-degree reflective type of polarizer used as the selection or output polarizer.

FIG. 4 illustrates what happens to the rejected wavelengths that emerge orthogonal to the output selection polarizer $P_s$, assuming that polarizer $P_s$ is a zero-degree reflective polarizer. The orthogonal component rejected by polarizer $P_s$, is passed back through the stack of retarders to the input polarizer $P_e$. Depending on the polarization state of this reflected light, a component aligned to the input polarizer $P_e$ may be transmitted backwards, but assuming that polarizer $P_s$, is also a zero-degree reflective polarizer, another component orthogonal to input polarizer $P_e$ is internally reflected and propagates forwardly once again along the light signal path.

Figure 5:
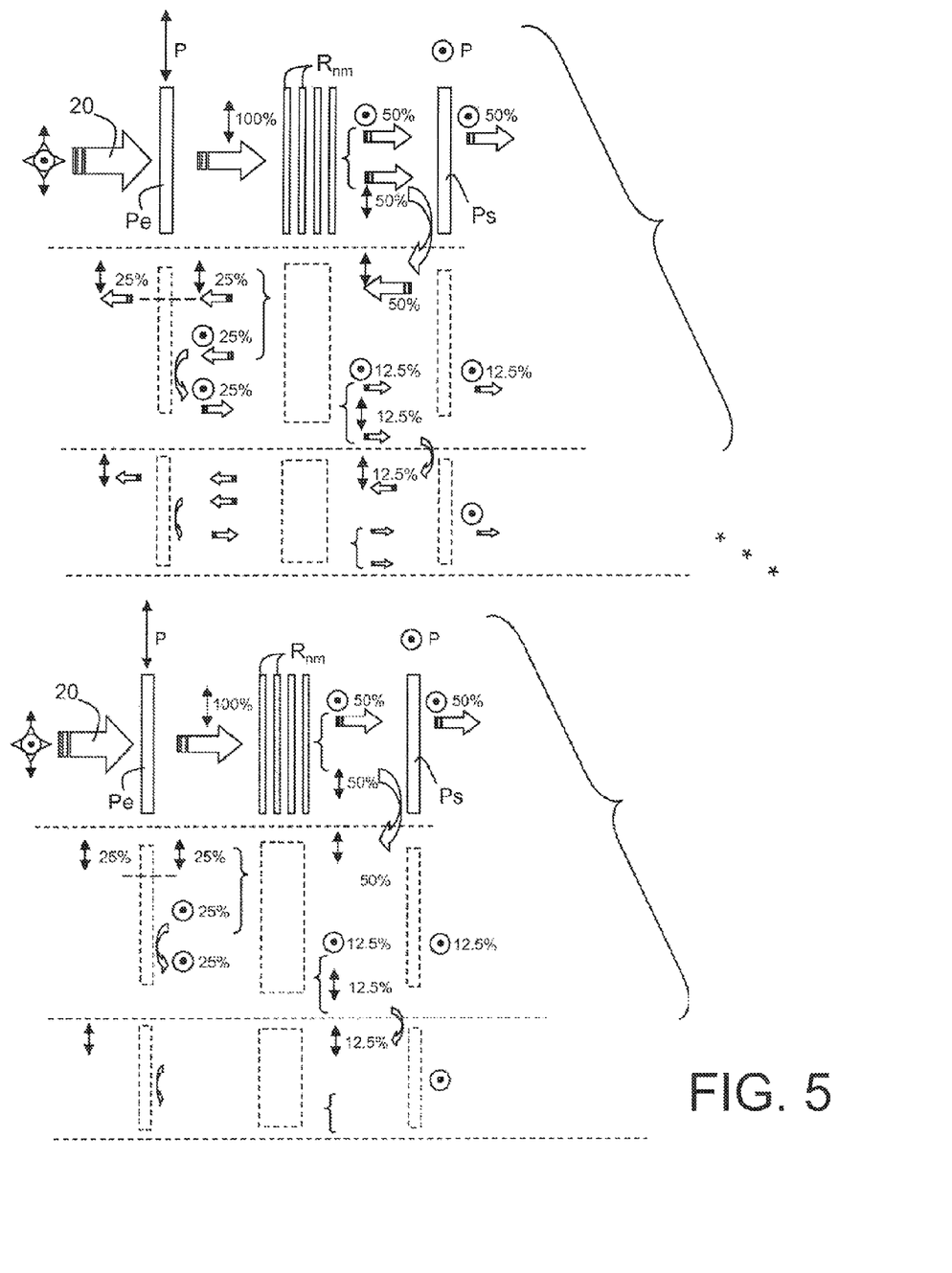
FIG. 5 is a schematic illustration of internal reflections in the pass band as shown in FIG. 4, wherein both the input and the selection polarizers are zero-degree reflective types.

This state of reflections is illustrated in FIG. 5, wherein the polarization states of components is shown. The illustrated polarization components are mutually orthogonal with the propagation axis, normal to the planes of the polarizers and retarders. As shown in FIG. 5, assuming random polarizations at each incidence against a polarizer and a 50% transmission ratio, half the light energy in the passband is transmitted directly though the filter and the orthogonal other half is reflected back. Half of the reflected 50% (now 25%) is reflected on the back side of the input polarizer $P_e$ and traverses the filter again as an internal reflection. Half of that light energy (now 12.5%) emerges in the alignment needed for transmission through the output polarizer $P_s$. Of that, approximate 3%, then 0.75% (and so on) can proceed by successive internal reflections to emerge from the filter.

If one sums the internal reflections with the direct traversing energy (50%+12.5%+3.125% etc.), one might expect that approximately 66% of the passband light energy could emerge from the filter when considering the second and third tries made possible by internal reflections.

Figure 6:
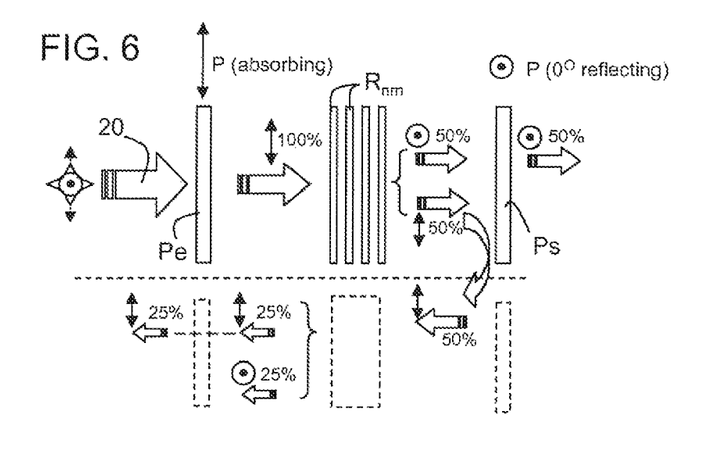
FIG. 6 demonstrates internal reflections in an embodiment according to FIG. 5, except wherein the leading polarizer (the input polarizer) of the given stage is specifically an absorptive polarizer.

An alternative embodiment is shown by FIG. 6. In this embodiment, the output polarizer $P_s$, is a zero-degree reflective polarizer that initiates internal reflection as described. However the entrance polarizer $P_e$ is specifically configured as an absorptive polarizer, i.e., a polarizer that absorbs rather than reflects a substantial part of the light energy that is not transmitted through the polarizer $P_e$. As a result, there is no substantial internal reflection from the back side of the entrance polarizer.

Figure 7:
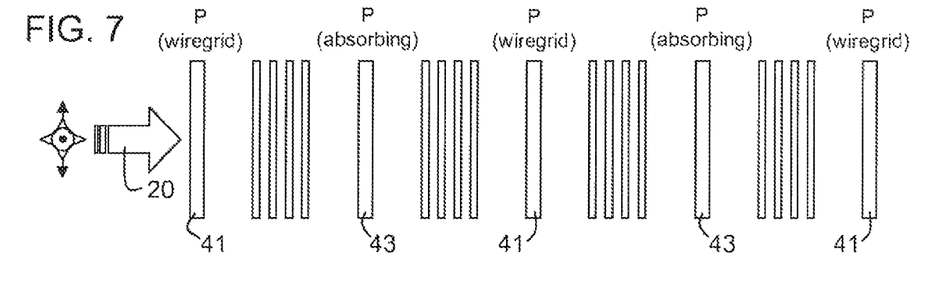
FIG. 7 is a schematic illustration of an embodiment comprising alternate zero degree reflective polarizers (e.g., wiregrid) and absorptive polarizers (e.g., comprising dichroic materials) in cascade.

It has been determined that in a cascade arrangement of plural stages, it is advantageous to employ an alternating succession of zero-degree reflective and absorptive polarizers as the entrance and selection polarizers of cascaded stages. This embodiment is shown in FIG. 7.

Figure 8:
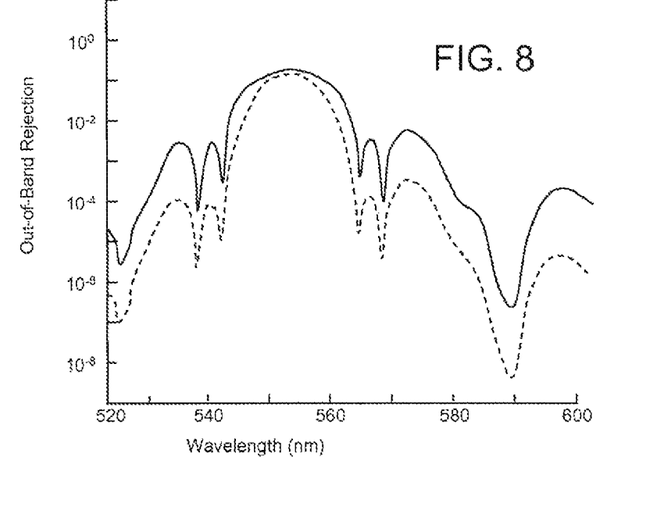
FIG. 8 is a comparative transmission spectrum showing the relatively poorer out-of-band rejection characteristics of filters using zero-degree polarizers (solid line trace) versus absorptive polarizers (broken line trace).

The alternating placement of zero-degree reflective and absorptive polarizer types improves the out of band rejection by the filter at the expense of a modest reduction in peak transmission band energy. Referring to FIG. 8, a cascaded stage filter having all wiregrid polarizers (solid line trace) has poorer out of band rejection that a cascaded stage filter having all absorptive polarizers (dashed line trace). But the wiregrid configuration has a better total peak energy as a passband (approx. 550 nm).

Figure 9:
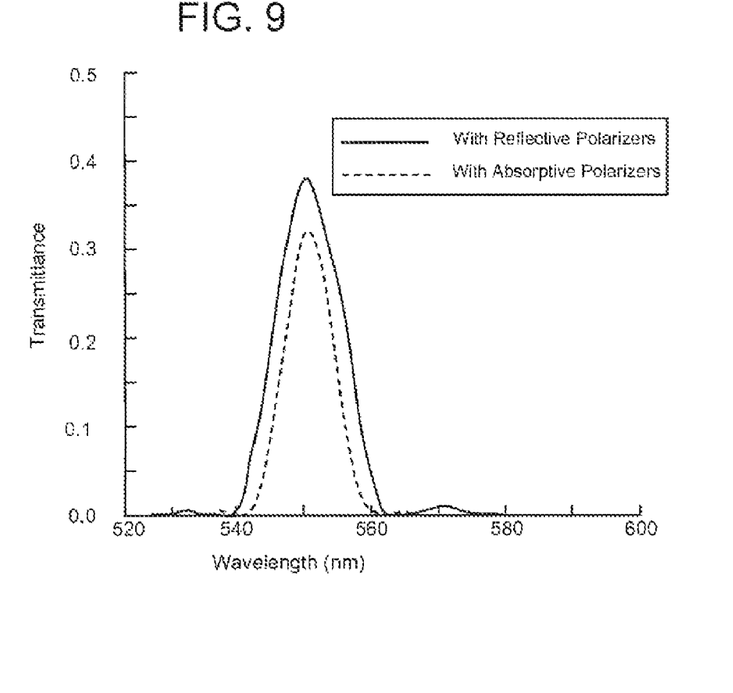
FIG. 9 is a comparison of corresponding transmission peaks in otherwise similar cascaded stage filters having all reflective or all absorptive polarizers.
Figure 10:
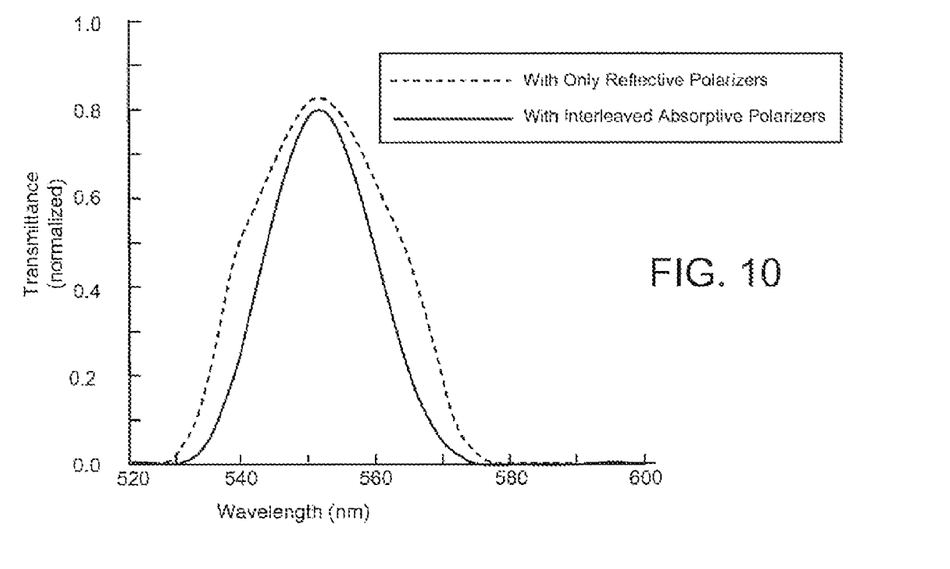
FIG. 10 is a comparison of corresponding transmission peaks in a normalized plot comparing an all-reflective multiple stage polarizer embodiment with an interleaved reflective/absorptive polarizer sequence, showing an improved (narrowed) bandwidth with little loss of passband transmittance at the center frequency of the passband.

FIG. 9 is a comparison showing a higher passband transmittance, but an unfavorably wider FWHM pass band width, for an embodiment with all zero-degree reflective polarizers (solid line) compared to an embodiment with all absorptive polarizers (dashed lines). FIG. 10 shows, on the other hand, that by interleaving absorptive polarizers with the zero-degree reflective polarizers (solid line), the normalized pass band transmittance is only somewhat reduced whereas the width of the pass band is narrowed considerably compared to all zero-degree reflective configurations (dashed line). These data show essentially that it is possible and advantageous to eliminate internal reflections using certain absorptive polarizers although the transmission ratio of the passband is somewhat reduced.

There are a variety of known configurations of spectral filters using stacked retarders in rotational orientations and thicknesses that are effective to discriminate for periodic wavelengths. As represented for example, and without limitation, by the Solc, Lyot and Evans configurations and their variants, a given filter stage may involve retarders of equal or mathematically related thicknesses and birefringences. There may be different numbers of polarizers required. The present disclosure is applicable to most or all of such variations, in particular with associated zero-degree reflective and non-zero degree reflective polarizers. For this purpose, polarizers are considered non-zero-degree polarizers if such polarizers absorb the component that is not transmitted, or divert the component that is not transmitted, in a direction other than directly backwards along the forward signal propagation path.

Figure 11A:
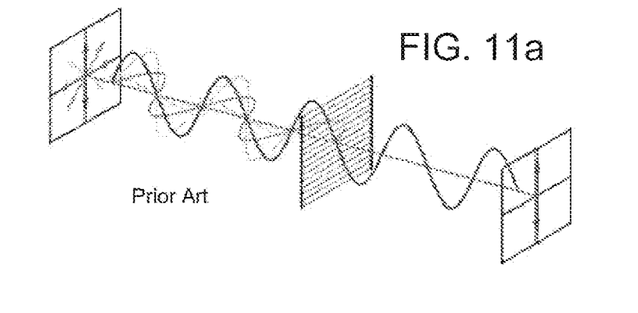
FIGS. 11a-11d illustrate alternative embodiments of known polarizers that can be considered zero-degree reflective, such as wire grid structures, or anti-zero degree reflective (effectively absorptive) because rejected light is removed from the nominal light transmission path normal to the parallel planes of stacked retarders and polarizers in filter stages.

In general, different sorts of polarizers transmit one of two orthogonal polarization components, and absorb or reflect or divert the other of the polarization components. One simple form of polarizer, a wiregrid polarizer, is shown in FIG. 11a, labeled "prior art." The wiregrid polarizer has a regular array of fine parallel metallic wires, in a plane perpendicular to the incident beam. Electromagnetic waves which have a component of their electric fields aligned parallel to the wires induce the movement of electrons along the length of the wires. Since the electrons are free to move, the polarizer behaves in a similar manner as the surface of a metal when reflecting light; some energy is lost due to Joule heating in the wires, and the rest of the wave is reflected backwards along the incident beam.

For waves with electric fields perpendicular to the wires, the electrons cannot move far because the width of each wire is much shorter than the length. Little energy is lost or reflected from an incident wave perpendicular to the wires. The transmitted wave substantially is transmitted through the grid. Electric field components parallel to the wires are absorbed or in large part reflected. For practical use, the separation distance between the wires is very small. The wire width is a small fraction of the separation distance. Lithographic techniques can be used to make very tight pitch metallic grids.

Certain materials exhibit dichroism, which is a preferential absorption of light that is polarized in a particular direction. They can therefore be used as polarizers. The rejected polarization component is substantially absorbed rather than reflected. Certain crystals are dichroic. A dichroic sheet can be made from polyvinyl alcohol plastic with an iodine doping. Stretching the sheet during manufacture aligns the polyvinyl alcohol plastic chains in one particular direction. Light polarized perpendicularly to the chains is transmitted.

Each polarizer described herein transmits one of two orthogonal light components and does not transmit the other component. However, as shown in this discussion, the rejected component might be absorbed or might be reflected. In a class of polarizers described herein a zero-degree reflective polarizers, not only is the rejected component reflected, but the rejected component is redirected in an opposite direction, parallel to the optical axis and normal to the plane of the polarizer in the case of a wiregrid type. It is also possible to produce a polarizer that handles the rejected component by diverting the rejected component in a different direction. This concept is illustrated in FIGS. 11b through 11d, also labeled "prior art."

Beam-splitting polarizers split the incident beam into two beams of differing polarization. For an ideal polarizing beamsplitter, the two beams are fully polarized, at orthogonal polarizations. For some beam-splitting polarizers, only one of the two output beams is fully polarized, which in the case of this disclosure would be the transmitted beam. The rejected polarization component may be directed in various directions and with a mixture of polarization states.

Figure 11B:
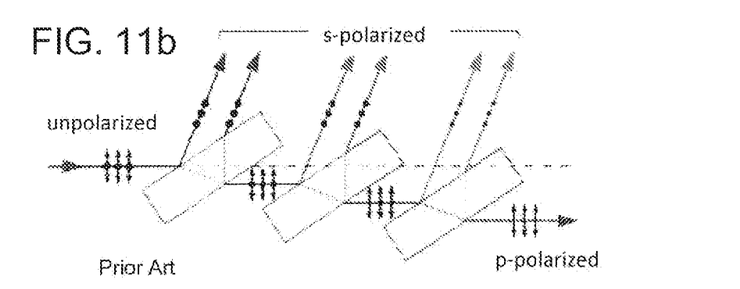

As schematically shown In FIG. 11b, a stack of plates at Brewster's angle to a beam reflects off a fraction of the s-polarized light at each surface, leaving a p-polarized beam. When light reflects at an angle from an interface between two transparent materials, the reflectivity is different for light polarized in the plane of incidence and light polarized perpendicular to it. Light polarized in the plane is said to be p-polarized, while that polarized perpendicular to it is s-polarized. At a special angle known as Brewster's angle, no p-polarized light is reflected from the surface, thus all reflected light must be s-polarized, with an electric field perpendicular to the plane of incidence.

Figure 11C:
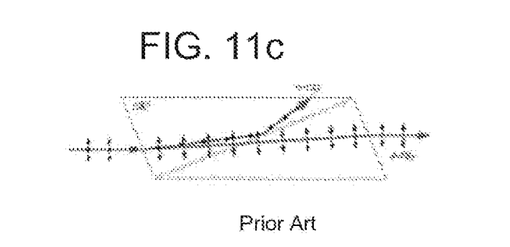
Figure 11D:
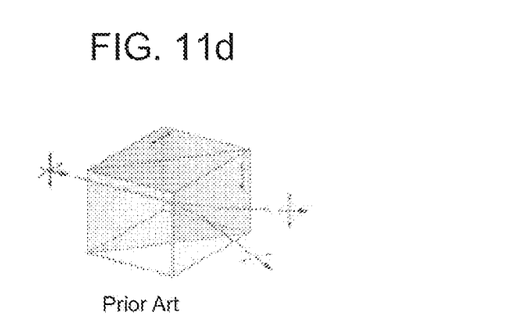

FIG. 11c shows a polarizer cube. A crystal (e.g., of calcite) is split and rejoined with a dielectric coating at the interface. The crystal is cut such that the o-and e-rays are in orthogonal linear polarization states and are directed in different directions. This type of polarizer has a high transmission ratio. Other known alternatives include the Glan-Thompson prism, Glan-Foucault prism, and Glan-Taylor prism. In these prisms, the transmitted beam is fully polarized.

FIG. 11d shows a Wollaston prism polarizer, having calcite prisms with orthogonal crystal axes cemented together. At the internal interface, a randomly polarized beam splits into two linearly polarized rays which leave the prism at a divergence angle of 15°-45°. The Rochon and Senarmont prisms are similar, but use different optical axis orientations in the two prisms. These prisms truly split the beam into two fully polarized beams with perpendicular polarizations.

The foregoing polarizers are applicable to the present filter embodiments. The number of polarizers might be greater or fewer, according to the various possible combinations of relative retarder thicknesses and relative rotation angles of known birefringent filter configurations.

According to the present disclosure, a filter for discriminating wavelengths in a light signal comprises a plurality of retarders $R_{nm}$ disposed along a path 20 of the light signal. The retarders are birefringent, i.e., each having a fast axis 35 and a slow axis 37 along which orthogonal components of the light signal propagate according to distinct optical indices. The retarders are rotationally oriented relative to one another (FIGS. 1, 3, 4) such that differential retardation of orthogonal components of the light signal causes certain wavelengths in the light signal to have predetermined polarization orientations at least at two locations along the path of the light signal (FIGS. 3-6). At least two polarizing filters $P_e$, $P_s$ are respectively located at the two locations along the path 20 of the light signal. The polarizing filters $P_e$, $P_s$, are rotationally oriented to correspond to the predetermined polarization orientations at the two locations. In this way, the polarizing filters each transmit a component of the light signal that is parallel to the respective polarization orientation and block transmission of a component of the light signal that is orthogonal to the respective said polarization orientation. The filter operates to distribute the wavelengths in the signal over a range of polarization states and alignments, and the result of the filter configuration is that the filter discriminates for transmission of said certain wavelengths and blocks others (FIGS. 8-10).

At least one of the polarizing filters ($P_s$ in FIGS. 3-6) is disposed at a further point along the path 20 of the light signal from another one of the polarizing filters ($P_e$) disposed at a nearer point along the path 20. The polarizing filter at said further point comprises a zero-degree reflective polarizing element 41 that transmits said component parallel to the polarization orientation while redirecting blocked orthogonal components oppositely along the path 20, and the polarizing filter at the nearer point comprises a polarizing element 43 that blocks orthogonal components without redirection along the path 20.

The zero-degree reflecting polarizing element 41 can be a wire grid or similar structure having parallel elongated conductive structures. The non-zero-degree polarizing filter at the nearer point that substantially absorbs the orthogonal (blocked) components can be a dichroic material, a stretched or otherwise oriented dichroic dye or crystal comprised sheet, a beam splitting and diverting polarizer or another similar device, provided that the blocked light energy is not simply reflected back in the opposite direction when blocked.

In certain embodiments (e.g., FIGS. 1 and 7) plural stages of retarders are disposed between first and second polarizers and the stages are arranged in a succession or cascade. Thus, the retarders of at least one of the stages along the path precede the polarizing filter at the further point, which comprises the zero-degree reflective polarizing element, and such retarders follow the polarizing filter at the nearer point, which comprises a polarizing element that blocks orthogonal components without redirection along the path.

In a filter configuration having one polarizer between successively abutting retarder stacks in stages (e.g., FIG. 7), every second stage has an absorbing polarizer 43 that precedes a zero-degree reflecting polarizer 41. In that case, internal reflections of blocked light components from the effective selection polarizer $P_s$ of that stage are directed backwards along the light path to the preceding polarizer, which has an absorptive element 43. The internal reflections are extinguished there.

Each alternating stage has a zero-degree reflecting polarizer 41 preceding an absorptive polarizer 43. In the case of those stages, the forward propagating light that the effective selection polarizer $P_s$ blocks from transmission is absorbed rather than reflected, so no internal reflection arises.

It would be possible to have only certain stages in a cascaded stage arrangement configured with zero-degree reflective and non-zero-degree reflective polarizers as discussed. In another embodiment, however, the plural stages of retarders all are disposed between said first and second polarizing filters of which the polarizing filter following the retarders along the path is zero-degree reflective and the polarizing filter preceding the retarders along the path is non-zero-degree reflective.

In the examples discussed, the retarders of one or more of the cascaded stages comprise tunable liquid crystals and can be substantially as described in U.S. Pat. No. 6,992,809—Wang, which has been incorporated by reference above.

In addition to the filter structure and configuration, the present disclosure concerns the method for discriminating for wavelength, including arranging a plurality of birefringent retarders $R_{nm}$ along a path 20 of a light signal, the retarders $R_{nm}$ each having a fast axis 35 and a slow axis 37, and propagating the light signal in a forward direction through the retarders such that orthogonal components of the light signal propagate according to distinct optical indices. The retarders are sized and rotationally oriented such that differential retardation of orthogonal components of the light signal causes certain wavelengths in the light signal to have predetermined polarization orientations at least at two locations along the path of the light signal. At these locations $P_e$, $P_s$, 41, 43, polarizing filters are disposed in rotational alignment with the polarization orientations. A discriminated pass band or succession of pass bands is transmitted through a zero-degree polarizing filter at least at one relatively further position on the path, that filter also redirecting a blocked component of the light signal backwards from the zero-degree polarizing filter, in an opposite direction along the path. Internal reflection of the blocked component is nevertheless prevented by using a non-zero-degree reflective polarizing filter at a nearer one of the locations along the path of the light signal.

More particularly, the non-zero degree polarizer at the nearer location can prevent internal reflections by absorbing the blocked component that was reflected backwards from the zero-degree reflective polarizer at the relatively further position. Alternatively, internal reflection of the blocked component is prevented in an embodiment wherein the non-zero-degree reflective polarizer causes the backwards-reflected component to diverge at an angle from the path.

In one embodiment, the zero-degree and non-zero degree reflective polarizers are alternated as the polarizers used between stacks of retarders in stages. In that case, the selection polarizer $P_s$ after one stage functions as the entry or input polarizer $P_e$ of the next stage. Every other stage has an absorptive polarizer (or another form of non-zero-degree polarizer) at the further position instead of the nearer position. This stage also quashes internal reflections, because the non-zero-degree polarizer at the further position does not internally reflect its blocked light component in the first place.

The subject matter of this disclosure has been described and explained with reference to a number of configurations that are intended to provide examples but not to limit the scope of the claims. On the contrary, reference should be made to the appended claims to determine the scope of the invention in which exclusive rights are claimed.

What is claimed is:

1. A filter for discriminating wavelengths in a light signal, comprising: a plurality of retarders disposed along a path of the light signal, the retarders each having a fast axis and a slow axis along which orthogonal components of the light signal propagate according to distinct optical indices; wherein the retarders are rotationally oriented relative to one another such that differential retardation of orthogonal components of the light signal causes certain wavelengths in the light signal to have predetermined polarization orientations at least at two locations along the path of the light signal; at least two polarizers respectively located at said two locations along the path of the light signal, wherein the at least two polarizers are rotationally oriented to the predetermined polarization orientations at said two locations, the polarizers each transmitting a component of the light signal that is parallel to a respective said polarization orientation and blocking transmission of a component of the light signal that is orthogonal to the respective said polarization orientation, whereby the filter discriminates for transmission of said certain wavelengths; and, wherein at least one of the polarizers is disposed at a further point along the path of the light signal from another one of the polarizers disposed at a nearer point along the path, wherein the polarizer at said further point comprises a zero-degree reflective polarizing element that transmits said component parallel to the polarization orientation while redirecting blocked orthogonal components oppositely along the path, and the polarizer at the nearer point comprises an absorptive polarizer that blocks orthogonal components by substantially absorbing said orthogonal components without redirection along the path; further comprising a plurality of stages of retarders between the polarizer at said nearer point and the polarizer at said further point, wherein the retarders of at least one of the stages along the path precede the polarizer at said further point comprising the zero-degree reflective polarizing element, and follow the polarizer at the nearer point which comprises an absorptive polarizer that blocks orthogonal components by substantially absorbing said orthogonal components without redirection along the path, wherein the plurality of stages comprise alternating zero-degree reflective polarizers and absorptive polarizers.

2. The filter of claim 1, wherein the polarizer at the further point comprises parallel elongated structures.

3. The filter of claim 2, wherein the polarizer at the further point comprises a wiregrid polarizing element.

4. The filter of claim 1, wherein the polarizer at the nearer point comprises a dichroic material.

5. The filter of claim 1, wherein the polarizer at the nearer point comprises an oriented dichroic dye material.

6. The filter of claim 1, wherein the polarizer at the further point substantially directs said orthogonal components in a direction diverging from said path.

7. The filter of claim 1, wherein at least two of the plurality of stages of retarders are disposed between the polarizer at said nearer point and the polarizer at said further point of which the polarizer following the retarders along the path is zero-degree reflective and the polarizer preceding the retarders along the path is an absorptive polarizer.

8. The filter of claim 1, wherein all of the plurality of stages of retarders are disposed between the polarizer at said nearer point and the polarizer at said further point of which the polarizer following the retarders along the path is zero-degree reflective and the polarizer preceding the retarders along the path is an absorptive polarizer.

9. The filter of claim 1, wherein the retarders in at least one of the stages comprises abutted retarders with aligned fast and slow axes forming a retarder unit.

10. The filter of claim 1, wherein the retarders of at least one of the stages comprise tunable liquid crystals.

11. The filter of claim 10, wherein the retarders of said at least one of the stages each comprises a birefringent crystal and a liquid crystal aligned therewith, and wherein the tunable retarders of said at least one of the stages are tunable in unison.

12. The filter of claim 11, further comprising a control voltage source coupled to the tunable retarders for tuning the retarders of said at least one of the stages in unison.

* * * * *